May 21, 1940.  A. E. MARGOLIS  2,201,239
DISTRICT HEATING PLANT
Filed Dec. 17, 1938
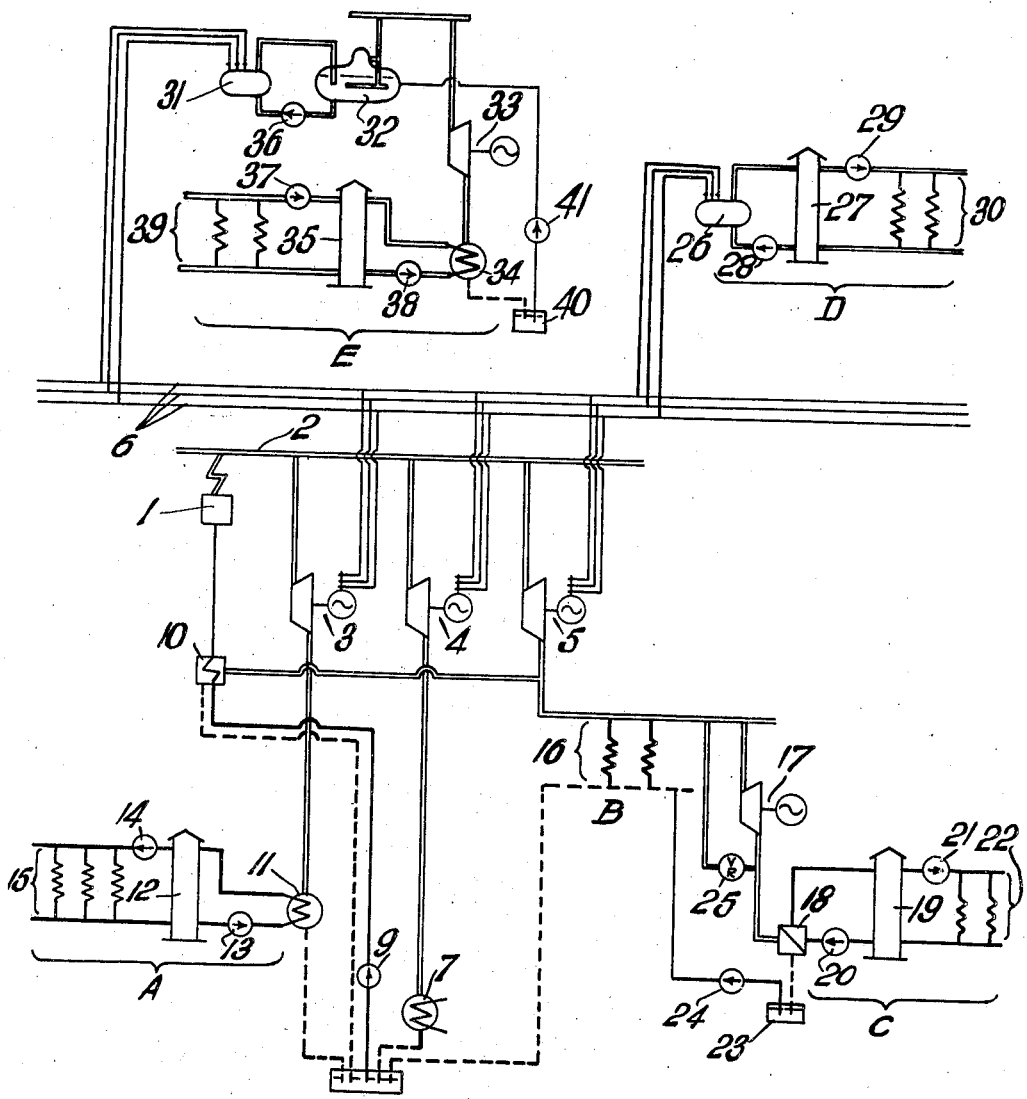

Patented May 21, 1940

2,201,239

UNITED STATES PATENT OFFICE 2,201,239

DISTRICT HEATING PLANT

Abraham Elia Margolis, London, England

Application December 17, 1938, Serial No. 246,505
In Great Britain December 17, 1937

3 Claims. (Cl. 290—2)

This invention relates to district heating plants and is concerned with application of exhaust or bled steam and of electric current for heat supply.

In district heating plants using exhaust steam, it is the practice to supply the buildings of a district with heat in the form of steam, hot water or superheated hot water through a pipe system. For equalising the different loads of power and heat requirements, heat storage has sometimes been applied.

The range of such a district heating plant is mainly limited by the heat density of the district and by the first costs of the distribution system. The erection of a heat distribution pipe system is especially expensive and sometimes even impossible in streets congested by traffic or already overfilled underground with pipes and cables for other services. Therefore the heat supply, even of districts with a good heat density, is often impossible.

The heat supply of entire districts by means of electricity or even of separate buildings is not possible on a large scale because the price of electric current even at the lowest tariffs is much too high to be generally applied.

The object of the present invention is to avoid these difficulties and to combine, or rather weld, power generation and district heating into one system enabling the heat supply of large districts or even of a whole town by means of exhaust heat and electricity.

The invention comprises the provision of one or several back pressure sets in a power station with exhaust heat supply for the larger districts within a certain distance of the power station, and electricity supply for smaller districts which are too far from the power station or are not convenient for direct heat supply, and a double system of thermal storage for exhaust heat and electric heat.

The accumulators for the exhaust heat can be arranged at the power station or at a convenient point of the pipe distribution system. The accumulators for electric thermal storage are placed in the districts which cannot be supplied with exhaust heat.

The electric power generated by the back pressure sets during the day and evening is used for the general supply, and the surplus of exhaust heat is stored in the form of steam, hot water or superheated hot water for the later supply of the pipe distribution systems. The electric power generated by the back pressure sets during the night and part of the day-time, when there is a surplus of capacity, is transmitted for thermal storage to the districts which are not conveniently situated for the supply with exhaust heat. From the accumulators which can also be arranged for steam, hot water or superheated hot water, the heat is delivered to the buildings or to the different apparatus inside a building by means of a pipe system.

The cost of electricity thus supplied for thermal storage is reduced by the value of the exhaust steam, utilised for direct heat supply. Of the heat of the live steam passing the back pressure turbine, the smaller part is transformed into electric power (with an efficiency of about 90%) and the larger part is regained in the exhaust. The total losses of this heat process depend mainly upon the pressure and temperature drop of the steam, but in any case they are very small, approximately 2% or 3% of the total heat. When the exhaust heat is utilised, the electricity can therefore be delivered for thermal storage at a cost only slightly exceeding the cost of steam in the power station, because the generating and transmission losses are very small.

The special advantage of the system is that this electricity can be delivered for thermal storage without any capital charges. The capital charges for the back pressure sets are covered by the generation of electric power for the general supply, and for the delivery of the electric power for thermal storage, the existing transformers, transmission lines and sub-stations if required, can be used in the off-peak periods. The accumulators for electric thermal storage must naturally be arranged at convenient points of the electric transmission system.

Electric heat generated at a very low price practically equal to that of live steam, will make possible the use of electricity for heating purposes on a very large scale and this will again increase the range of the exhaust heat supply. This will facilitate the application of big back pressure sets for power generation to meet the high electric peak loads in the autumn and winter. As an ultimate result of this development, the capacity of the condensing sets of the urban power stations will have to meet only the much smaller summer loads. Due to this fact, the load factor of the condensing sets will be considerably improved. The back pressure sets will also work with a good load factor because the surplus of their capacity in the off-peak periods will be used to a great extent for electric power generation for thermal storage and heat supply.

The accumulators for electric thermal storage can be arranged for generation of high pressure steam to feed special back pressure sets for power generation to meet the requirements of the districts in the back peak periods. The exhaust heat of the turbines may be supplied to the connected buildings either directly or by means of additional hot water storage. This arrangement has the advantage that expensive peak power is generated from very cheap electricity and that the boiler capacity of the power station and also the capacity of the transformers, transmission lines and sub-stations can correspondingly be reduced.

Peak power can also be generated between different pressure stages of the distribution system, for instance in the course of a steam main for a factory district with an adjacent hot water distribution for a residential district. The different loads of the power and heat requirements can be equalised by hot water storage.

For the supply of a very big district or of a whole town it may sometimes be of advantage to arrange the heat distribution even with three pressure stages, for instance when heat is to be supplied from the power station in the course of the distribution mains first to a factory district with a steam pressure demand of, say, 150 lbs. per square inch, then to an office building district, with a steam pressure demand of, say, 50 lbs. per square inch and at last to a residential district with a hot water system the water of which can be heated by steam of, say, 50% vacuum. In such a case the electric power is generated by back pressure sets in the power station and sub-stations situated in the office and residential districts. The power capacity of these sub-stations can be increased by condensing sets to meet the peak requirements of the districts.

The invention will now be more particularly described, by way of example, with reference to the accompanying drawing, showing a diagram of power generation and heat distribution plant.

From the boiler plant 1 with steam main 2 the steam is supplied to the sets, or groups of sets, 3, 4, and 5. The generated electric power is transmitted to the transmission lines 6. The set 4 is the normal condensing set with condenser 7 and, in common with the other sets, with condensate tank 8, feed water pump 9 and feed water heater 10.

The sets 3 and 5 are back pressure sets (with by-passes and reducing valves which are not shown in the drawing) from which the exhaust heat is supplied to distributing systems A, B and C.

Distribution systems D and E are supplied by means of electric heat.

The distribution system A is for hot water with heat supply from back pressure set 3 and consists of the condenser 11, hot water accumulator 12, circulating pumps 13 and 14 and the pipe system with building connections 15.

The distribution system B is for steam and it is supplied from back pressure set 5 and consists of the pipe system with building connections 16. With the steam distribution system B is combined a hot water distribution system C. Between the pressure stages of these two systems power generation is arranged by the back pressure set 17.

The water is heated in calorifier 18 and circulated by pumps 20 and 21 through the hot water accumulator 19 and pipe system 22. The condensate from calorifier 18 is carried to condensate tank 23 and by pump 24 through the condensate main to the power station. Between the steam feed pipe and the turbine exhaust is arranged a by-pass with reducing valve 25.

The system D supplied with electric heat, consists of an electrode or other type electric boiler 26, hot water accumulator 27, circulating pumps 28 and 29 and pipe system 30.

The system E is supplied with electric heat for heating and generation of peak power. It consists of boiler 31, steam accumulator 32, turbo-generator 33, condenser 34, hot water accumulator 35, circulating pumps 36, 37, 38 and pipe system with building connections 39. The condensate is delivered to tank 40 and thence by pump 41 to the steam accumulator.

The loading and unloading of all accumulators can be effected by hand or automatically by means of pressure and/or temperature devices.

The loading and unloading pumps for the hot water accumulators can sometimes be combined into one system.

What I claim and desire to secure by Letters Patent is:

1. A system of district heating with power generation which comprises the steps of generating electricity by means of a back pressure set in a power station at a substantially constant load, supplying the exhaust heat to a certain district suitably situated for exhaust heat supply in relation to the power station and equalizing the fluctuations of the heating load by means of exhaust heat storage, transmitting the surplus of electric energy generated by said back pressure set to a district unsuitable for exhaust heat supply, thermally storing in said district unsuitable for exhaust heat supply the electric energy so transmitted and supplying the heat stored in and to said district unsuitable for exhaust heat supply.

2. A system of district heating with power generation which comprises the steps of generating electricity by means of a back pressure set in a power station at a substantially constant load, supplying the exhaust heat to a certain district suitably situated for exhaust heat supply in relation to the power station and equalizing the fluctuations of the heating load by means of exhaust heat storage, transmitting the surplus of electric energy generated by said back pressure set to a district unsuitable for exhaust heat supply, thermally storing in a steam accumulator in said district the electric energy so transmitted, utilizing the steam from said steam accumulator to feed a back pressure set for electric power generation for said district during peak periods, and storing and supplying the exhaust heat of said last mentioned back pressure set to said district unsuitable for exhaust heat supply from the main set of the power station.

3. A system of district heating with power generation which comprises the steps of generating electricity by means of a back pressure set in a power station at a substantially constant load, supplying the exhaust heat in different pressure stages to a certain district suitably situated for exhaust heat supply in relation to the power station and equalizing the fluctuations of the heating load by means of exhaust heat storage, generating additional peak power between said different pressure stages of the exhaust heat distribution system, transmitting the surplus of electric energy generated by said back pressure set to a district unsuitable for exhaust heat supply, thermally storing in said district unsuitable for exhaust heat supply the electric energy so transmitted and supplying the heat stored in and to said district unsuitable for exhaust heat supply.

ABRAHAM ELIA MARGOLIS.